United States Patent
Loberger (10) Patent No.: US 7,375,676 B1
(45) Date of Patent: May 20, 2008

(54) MUTUAL INTERFERENCE PROCESSOR FOR PULSE RADAR

(75) Inventor: David G. Loberger, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 262 days.

(21) Appl. No.: 11/369,439

(22) Filed: Mar. 7, 2006

(51) Int. Cl.
*G01S 13/52* (2006.01)
*G01S 13/00* (2006.01)

(52) U.S. Cl. .......................................... 342/160; 342/99
(58) Field of Classification Search ............ 342/90–93, 342/98–101, 159–162, 174, 195; 367/90, 367/91, 901
See application file for complete search history.

(56) References Cited

U.S. PATENT DOCUMENTS 4,827,263 A * 5/1989 Jones et al. ................... 342/59
5,327,141 A * 7/1994 Sheldon ....................... 342/159
5,841,395 A * 11/1998 Simone ....................... 342/196

* cited by examiner

*Primary Examiner*—Thu Nguyen
*Assistant Examiner*—Peter M Bythrow
(74) *Attorney, Agent, or Firm*—Duane Morris, LLP (57) ABSTRACT

Pulsed or mutual interference in a pulse radar system is ameliorated by a process that includes a pulse-Doppler filter, some frequency bins of which correlate with clutter. Pulsed interference is identified, and the corresponding column vectors of a pulse-Doppler-filter-equivalent matrix are identified. The row values of the corresponding interference-affected column vectors that correlate with clutter are nulled. The vectors are orthogonalized, and then converted to measurement and correction signal vectors for application to the pulse-Doppler received signals. Vector dot products of the measurement signal vectors with the received signals are calculated, to produce pulsed interference measurements that are nominally free of clutter. The pulsed interference measurements are combined with the correction signals which are then subtracted from the received signals to produce signals that are nominally free of pulsed interference. In one embodiment, the pulsed interference-free received signals are applied to a pulse-Doppler filter to suppress the clutter signals.

20 Claims, 5 Drawing Sheets

MUTUAL INTERFERENCE PROCESSOR FOR PULSE RADAR

FIELD OF THE INVENTION

This invention relates to interference suppression in sensors such as radar, sonar, and lidar.

BACKGROUND OF THE INVENTION

Radar (including sonar and lidar) has been known and used by man for 60 years or more. During this time, many improvements have been devised for correcting various sensor deficiencies and frailties. Among the early improvements was the suppression of clutter by adoption of moving target indication (MTI), which tended to suppress the display of targets which had little or no motion, as measured by lack of a pulse-to-pulse phase shift in the reflected signal echo. The problem of the inverse-fourth-power amplitude of the signal returns was substantially solved by increasing the gain of the radar receiving systems as a function of the fourth-power of time following transmission of each energy pulse, in order to maintain relatively constant amplitude of the target signal returns during processing.

Among the remaining problems of radar-type sensors are lack of good remedies for mutual interference between or among multiple radar sensors located in close proximity to each other. It is easy to understand that if two or more radars that are in close proximity to each other, transmit pulses in a common operating frequency band, each radar system will receive signals directly from the other radar(s) that are more-or-less indistinguishable from reflections from radar targets. These directly-received pulsed interference signals can be of large-amplitude and can tend to saturate receiving systems and target displays. This well-known problem manifests itself in increases in false alarm rates and in undesirable losses of sensitivity for detecting radar targets. Mutual interference is a serious problem for many types of radar, and is expected to be a continuing problem for future radar concepts.

More recently, pulse-Doppler radars were devised to improve upon MTI radars. Pulse-Doppler radars can operate in conditions where signals from severe clutter environments are received together with signals from intended targets. Pulse-Doppler radars use pulse-Doppler filters to convert the time-domain reflected radar signals to the frequency domain in order to suppress the clutter and maintain target detection sensitivity. Clutter suppression is accomplished by rejection or attenuation of those components of the signal returns that show zero or small frequency offsets from the transmitted signals. Mutual interference can be a more severe problem for pulse-Doppler radars than for other radars due to the inherent nature of pulse-Doppler signals and pulse-Doppler filter processing. The increased severity is due to the fact that if mutual interference occurs anytime during the transmission and reception of a pulse-Doppler waveform, detection sensitivity can be degraded for the entire waveform. And since pulse-Doppler waveforms can consist of long sequences of high-energy pulses, not only can mutual interference be more likely to occur, but it can also render useless more significant amounts of expended radar resources consisting of high-energy pulses.

In a simple prior-art arrangement, radar pulse-Doppler signal returns consisting of target and clutter signals are applied to a pulse-Doppler filter to transform the input time-series signal returns, into output Doppler-frequency domain signal measurements. This allows the system to resolve and separate the clutter signals from the intended target signals based on differences in their Doppler frequencies. The clutter signals are then suppressed either by setting their Doppler-frequency components to zero or by excluding them from detection processing. If pulsed interference occurs in the radar pulse-Doppler signal returns, together with target signals and clutter signals, then the pulsed interference appears on the output of all of the pulse-Doppler filters because of its wide frequency distribution. It can therefore mask the existence of intended target signals, which in turn degrades radar target detection sensitivity.

Methods which have been used in the prior art to ameliorate the problem of mutual interference for pulse-Doppler radars include blanking of the portions of the signals that are contaminated with pulsed interference; "repair" by interpolation of the portions of the signals that are contaminated with pulsed interference; pulse-Doppler filters that are adapted to the pulsed interference, and coherent sidelobe signal cancellation. While blanking effectively removes pulsed interference, it is not compatible with pulse-Doppler filter suppression of high levels of clutter signals. When blanking is used during occurrences of combined pulsed interference and clutter signals, the portions of the clutter signals that overlap with the pulsed interference are also blanked. Radar target detection sensitivity is degraded because blanking of portions of the clutter signals degrades pulse-Doppler filter capabilities for suppressing the clutter signals. This is a serious shortcoming because combined pulsed interference and high levels of clutter signals are a common occurrence. "Repair" by interpolation improves upon blanking by replacing clutter signals that are contaminated by pulsed interference with interpolated signals that are compatible with pulse-Doppler filter suppression of high levels of clutter signals. "Repaired" signals are obtained by applying an interpolation algorithm to the received signals that are temporally adjacent to the contaminated signals. (This process is sometimes referred to as "linear prediction".) Interpolation fails if any of the temporally adjacent signals are also contaminated by pulsed interference. This is a serious shortcoming because contamination of temporally adjacent signals commonly occurs. Pulse-Doppler filters that are adapted to the pulsed interference solve the problem by synthesizing and applying a new pulse-Doppler filter for each change in condition of the pulsed interference. While this method is compatible with pulse-Doppler filter suppression of high levels of clutter signals, and is also compatible with occurrences of temporally adjacent signals also being contaminated by pulsed interference, its implementation is generally considered to be too costly to be practical due to the large amount of computer computation that is required to synthesize new filters. Additionally, it is not compatible with existing and optimized pulse-Doppler filter architectures that are based on fast-Fourier transform processing algorithms. Coherent sidelobe signal cancellation is an effective solution to pulsed interference, but only if a sufficiently large number of coherent sidelobe signal cancellation channels are implemented in the radar, and the levels of the pulsed interference are sufficiently low so that the receiver does not exceed its linear dynamic region. When the linear dynamic region of the receiver response is exceeded, intermodulation and cross-modulation signal products are produced which are incompatible with coherent sidelobe signal cancellation. This is a serious shortcoming because pulsed interference will commonly exceed receiver linear dynamic regions when radars are in close proximity.

Improved andor alternative mutual interference suppression for pulse-Doppler radar, sonar, lidar, and equivalent, is desired.

SUMMARY OF THE INVENTION

A method according to an aspect of the invention is for sensing remote targets in the presence of interfering signals. The method comprises the step of radiating energy toward the target, and sensing or receiving reflected energy containing amplitude and phase information relating to the target, for generating received energy signals. The received energy signals may be contaminated by clutter signals at Doppler frequencies of clutter, and by pulsed interference. The method includes the step of generating time-distribution signals which characterize the distribution of the pulsed interference within the received energy signals. Measurement signals are generated from the time-distribution signals. The measurement signals represent the normalized-amplitude pulsed interference in a Doppler frequency region which is free of clutter signals. Correction signals are also generated from the time-distribution signals. The correction signals represent the normalized-amplitude pulsed interference over the entire Doppler frequency region, including the Doppler frequency region of the clutter signals. The received energy signals are processed with the measurement signals to generate nominally clutter-free interference signals representing phase and amplitude estimates of the pulsed interference. The clutter-free phase and amplitude estimates of the pulsed interference are used to adjust the phases and amplitudes of the correction signals to generate estimated pulsed interference. The estimated pulsed interference is subtracted from the received energy signals to produce received energy signals which nominally include clutter signals and that are nominally free of pulsed interference. In a mode of the method, the step of processing the received energy signals with the measurement signals includes the calculation of an inner product, which may be a vector dot product. In another mode of the method, the clutter-free phase and amplitude estimates of the pulsed interference are in the form of complex numbers, and the step of using the clutter-free phase and amplitude estimates to adjust the phases and amplitudes of the correction signals comprises the step of calculating a product, which may be an arithmetic complex multiplicative product. In another mode of the method, the step of generating correction signals which represent the amplitude-normalized pulsed interference includes the steps of converting the signals which characterize the time-distributions of the pulsed interference into Doppler interference distribution signals which characterize the Doppler frequency distribution of the pulsed interference, and orthogonalizing the Doppler interference distribution signals to uniquely represent the frequency components of the pulsed interference. The orthogonalized correction signals are converted from the frequency domain to the time domain for application to the received energy signals. In another mode of the method, the step of generating measurement signals includes the steps of converting the signals which characterize the time-distributions of the pulsed interference into signals which characterize the Doppler frequency distribution of the pulsed interference, and deleting or suppressing those frequency components of the Doppler frequency distribution signals which lie in the region of clutter frequencies, to thereby generate clutter-free pulsed interference measurement signals. The clutter-free pulsed interference measurement signals are orthogonalized to generate signals which uniquely represent the frequency components of the pulsed interference that are free of clutter signals. The orthogonalized clutter-free pulsed interference measurement signals are amplitude-normalized. The normalized and orthogonalized clutter-free pulsed interference measurement signals are converted from the frequency domain to the time domain for application to the received energy signals. One mode of the method further comprises the step of applying the received energy signals, that nominally include clutter signals and that are nominally free of pulsed interference, to a pulse-Doppler filter for removal of the clutter signals.

A method according to another aspect of the invention for sensing remote target(s) in the presence of interfering and clutter signals comprises the steps of radiating sets of sequential pulses of energy toward the target, and receiving reflected energy containing amplitude and phase information relating to the target to thereby generate received energy signals, which may be at baseband or at an intermediate frequency, and which may be analog or digital. The identity (ies) of those pulses of the sequence which are contaminated with pulsed interference are extracted from the received energy signals and listed. A pulse-Doppler filter bank including a plurality of filters is provided, where each of the plural filters is associated with a different frequency range, some of which frequency ranges are associated with clutter signals. A matrix corresponding to the pulse-Doppler filter bank is identified, in which each column of the matrix corresponds to a pulse of the sequence, and in which each row of the matrix corresponds to a frequency range different from that of other filters of the pulse-Doppler filter bank. Those column(s) of the matrix corresponding to the contaminated pulses of the sequence are identified. Those rows of the identified column(s) of the matrix which correspond to the Doppler frequencies of the clutter are set to zero and orthogonalized to remove or reduce projection overlap or interdependencies, and are then normalized to produce frequency-domain pulsed interference measurement signals. The identified columns(s) of the matrix are also directly orthogonalized to remove projection overlap or interdependencies and produce frequency-domain pulsed interference correction signals. In a mode of the method the frequency-domain measurement and correction signals are converted to the time domain. The resulting time-domain measurement signals are then applied to the received energy signals in the time domain in order to obtain amplitude and phase estimates of the pulsed interference. The amplitude and phase estimates are used to adjust the time-domain correction signals. The time-domain correction signals are then combined or processed with the time-domain received energy signals to remove or reduce the pulsed interference. The resulting received energy signals with nominally reduced or removed pulsed interference are then applied to the pulse-Doppler filter bank to remove or reduce the clutter signals. In another mode of the method the received energy signals are first processed by a pulse-Doppler filter bank to thereby remove or suppress the clutter signals and produce frequency-domain received energy signals. The frequency-domain measurement signals are then applied to the frequency-domain received energy signals in order to obtain amplitude and phase estimates of the pulsed interference. The amplitude and phase estimates are used to adjust the frequency-domain correction signals. The adjusted frequency-domain correction signals are then combined or processed with the frequency-domain received energy signals to tend to reduce the effect of the pulsed interference and to aid in extraction of information relating to the target from the phase and amplitude information in the frequency-domain received energy signals. The step of combining may consist of a difference or subtraction.

According to another aspect of the invention, a method for obtaining information about a remote target in the presence of clutter and mutual interference comprises the step of transmitting toward the target pulses of electromagnetic energy, and receiving reflected energy signals including phase and amplitude information, and possibly clutter and pulsed interference, to thereby generate received energy signals. The received energy signals are processed to produce pulsed interference indicative signals, indicative of which pulse portions of the received energy signals are contaminated with pulsed interference. A pulse-Doppler filter bank including at least an input port and output ports is provided. The pulse-Doppler filter bank defines at least one frequency bin which is representative of clutter. A matrix is defined, the rows and columns of which relate to the characteristics of the pulse-Doppler filter bank. From the pulsed interference indicative signals, those columns of the matrix to which the pulsed interference relates are selected, to thereby produce interference related column vectors. Those rows of the interference related column vectors which are associated with clutter signals in the pulse-Doppler filter bank are tagged for being rendered ineffective, to thereby produce column vectors with row values set to zero. The column vectors with row values set to zero and the pulsed interference related column vectors are orthogonalized, to thereby produce orthogonalized column vectors with row values set to zero and orthogonalized interference related vectors. The orthogonalized vectors with row values set to zero are normalized. The normalized and orthogonalized vectors with row values set to zero are multiplied by the complex-conjugate-transpose of the matrix to produce pulsed interference measurement vectors. The orthogonalized pulsed interference related column vectors are multiplied by the mathematical pseudo-inverse of the matrix to produce pulsed interference correction vectors. The vector dot products of the received energy signals and the measurement vector(s) is or are calculated to thereby generate phase and amplitude measurements of the pulsed interference that are nominally free of clutter. The correction vectors are adjusted or processed in conjunction with the clutter-free phase and amplitude measurements of the pulsed interference, to thereby produce pulsed interference equivalent correction signal vectors. The adjustment or processing may be in the form of multiplication. The pulsed interference equivalent correction signal vectors are subtracted from the received energy signals to produce adjusted received energy signals that are nominally free of pulsed interference. In one mode of the method, the adjusted received energy signals that are nominally free of pulsed interference are applied to an input port of the pulse-Doppler filter bank to suppress the clutter signals.

BRIEF DESCRIPTION OF THE DRAWING

FIGS. 1a, 1b, 1c, 1d, 1e, and 1f are amplitude-vs.-time plots of a time-series of clutter and target returns from transmitted pulses;

FIGS. 3a, 3b, 3c, 3d, 3e, and 3f are amplitude-vs.-time plots of a time-series of pulses similar to those of FIGS. 1a through 1f, with the addition of pulsed interference;

DESCRIPTION OF THE INVENTION

This invention tends to reduce or remove pulsed interference by a process that is compatible with pulse-Doppler filter suppression of clutter signals, and thereby maintains radar target detection sensitivity during combined clutter and pulsed interference conditions.

Figures 1, 1A, 1F:
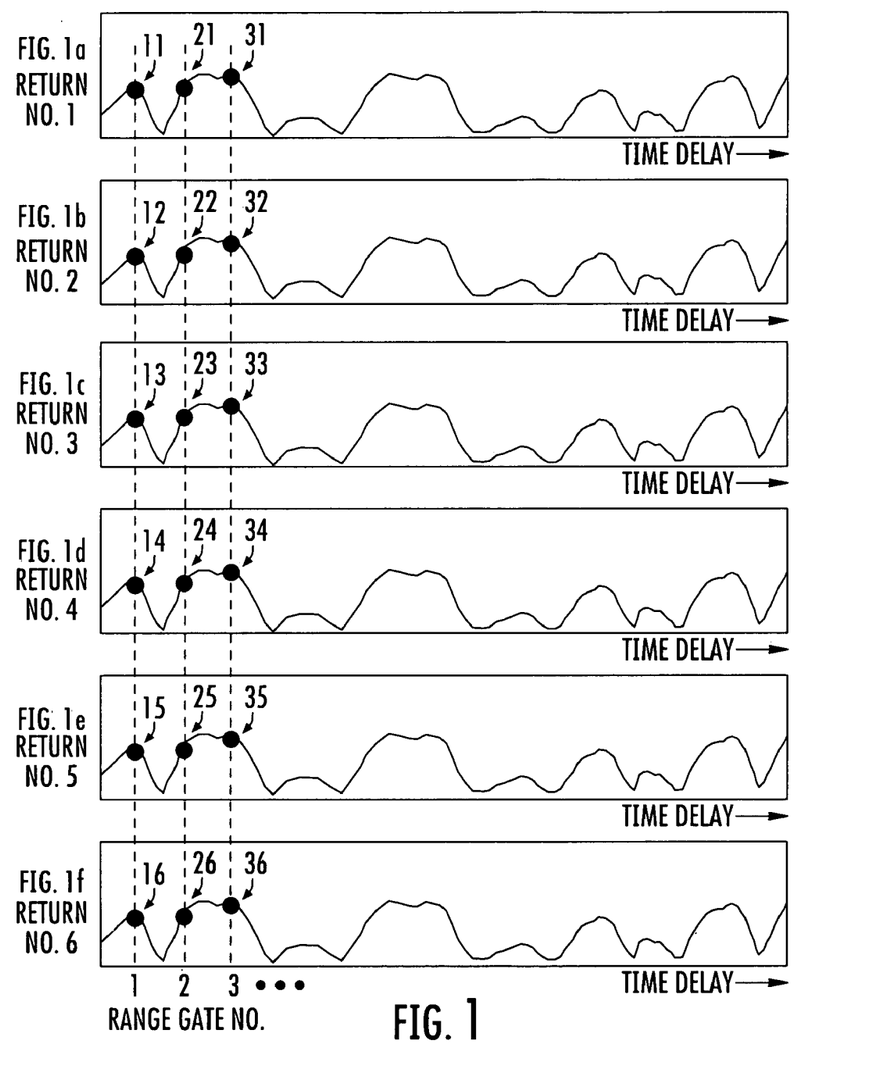

In general, pulse-Doppler radar signals consist of trains or time-series sequences of signals, such as pulses, that can be used to measure the Doppler frequencies of target objects in order to filter clutter signals from target signals. In a typical operating scenario, after the first pulse is transmitted, its reflected signal return is then received until the time at which the second pulse is transmitted. After the second pulse is transmitted, its reflected signal return is then received until the time at which a third pulse is transmitted. This transmission and reception cycle is continued until all pulses in the sequence are transmitted and received. Alternatively, several or all pulses in the sequence may be transmitted prior to the start of reception for long-range operation of the radar. FIGS. 1a, 1b, 1c, 1d, 1e, and 1f illustrate the returns from a sequence of 6 sequentially transmitted pulses. That is, FIG. 1a plots the return as a function of time following the transmission of a first pulse of the pulse sequence, FIG. 1b plots the return as a function of time following the transmission of a second pulse of the pulse sequence, FIG. 1c plots the return as a function of time following the transmission of a third pulse of the pulse sequence, FIG. 1d plots the return as a function of time following the transmission of a fourth pulse of the pulse sequence, FIG. 1e plots the return as a function of time following the transmission of a fifth pulse of the pulse sequence, and FIG. 1f plots the return as a function of time following the transmission of a sixth pulse of the pulse sequence. The returns as illustrated in FIGS. 1a through 1f are nearly identical, because the target and clutter have not moved significantly in or during the relevant times.

In general, pulse-Doppler signals can consist of sequences of other numbers of pulses than six, and usually consist of sequences of many more pulses. The amplitude of each signal return is plotted as a function of time delay relative to when it was transmitted, and represents the signal that was reflected from radar targets and clutter located at a range distance from the radar that corresponds to the round-trip travel time delay. The signals provide measurements of amplitude and phase for each range gate (time delay) that is digitally sampled. The time-series measurements representing the signal returns can be viewed as being arranged into column vectors, x, one vector for each range gate that is digitally sampled. This is illustrated in FIGS. 1a through 1f by plotting the signal returns above one another and relative to a common time delay axis, and identifying the signal return samples that correspond to Range Gate No. 1, Range Gate No. 2, Range Gate No. 3, . . . . Each signal return sample in a range gate can be viewed as being an element of a vector, x, consisting of N elements, with each element being a sample from one of the N signals that are transmitted and received in sequence. The example of FIGS. 1a through 1f is for 6 signal returns, so N=6. The signal samples designated as 11, 12, 13, 14, 15 and 16 in FIGS. 1a through 1f are the element values in the vector, x, for Range Gate No. 1. The signal samples designated as 21, 22, 23, 24, 25 and 26 are the element values in the vector, x, for Range Gate No. 2, and the signal samples designated as 31, 32, 33, 34, 35, and 36 are the element values in the vector x for Range Gate No. 3, . . . . These range gate vectors, or range gates, are processed by a bank of pulse-Doppler filters in order to suppress, and prevent masking of intended target signals by, high levels of clutter interference, and thereby provide the radars with target detection sensitivity.

According to an aspect of the invention, when signals within a sequence are contaminated with pulsed interference, "Correction" vectors are synthesized, scaled in amplitude and adjusted in phase, and then subtracted from the contaminated signals in order to tend to reduce and remove the pulsed interference. The Correction vectors are synthesized in response to the specific pulsed interference, are compatible with the pulse-Doppler filters and do not significantly degrade their capabilities to suppress clutter signals. The values of amplitude and phase that are used to scale and adjust the Correction vectors are obtained by applying "Measurement" vectors to the contaminated signals prior to correction. The Measurement vectors exclude known Doppler-frequency components of the clutter signals. After pulsed interference is removed by this process, the pulse-Doppler signal returns are then sent to a conventional pulse-Doppler filter bank for suppression of the clutter signals and then on to signal integration and detection processing to determine the existence of target signals. Radar target detection sensitivity is therefore maintained because pulsed interference is reduced andor removed by a process that is compatible with, and does not significantly degrade, pulse-Doppler filter capabilities for suppressing clutter signals.

Figure 2:
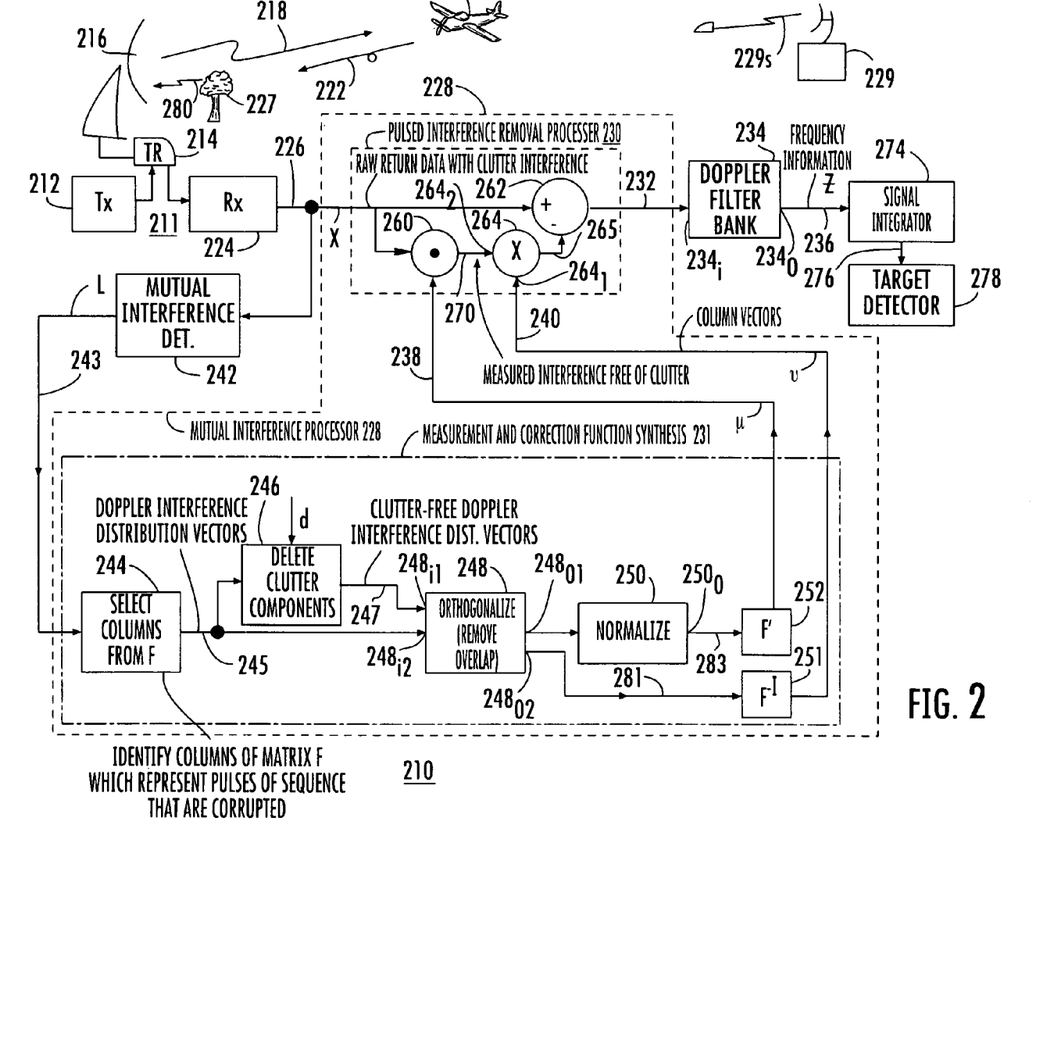
FIG. 2 is a simplified block diagram of a radar system according to an aspect of the invention.

FIG. 2 is a simplified block diagram of a radar system 210 according to an aspect of the invention. In FIG. 2, a sensor 211 in the form of a radar transmitter (TX) 212 produces trains or sequences of transmit pulses within a carrier frequency band, such as S-band (around 3000 MHz), and routes the pulse sequences by way of a transmit/receive (TR) device 214 to an antenna 216. The antenna 216 acts as a transducer between guided electromagnetic waves within the radar system and unguided electromagnetic waves in free-space, with the result that radiation energy illustrated as a "lightning bolt" 218 is transmitted toward a target 220. A portion of each pulse of radiation energy is reflected from the target, to produce a reflected signal, or "return", as illustrated by a lightning bolt 222, which is captured by the antenna 216. Additionally, the antenna 216 captures clutter signal energy 280 that is reflected from clutter objects, illustrated as a tree 227, that are within the field of view of the radar and pulsed interference. Pulsed interference consists of signals 229s entering antenna 216 directly from other radar systems or other electronic sources, as illustrated by a block 229.

The combined target, clutter and pulsed interference signal return energies 222, 280 and 229s enter antenna 216 of FIG. 2, and are routed by TR device 214 to a receiver (RX) 224, which processes the return signals by filtering or rejecting out-of-band signals, amplifying andor down-conversion as may be required, and conversion from analog to digital form. Receiver block 224 may also perform other conventional radar signal processing functions, such as gain and phase adjustments, to produce output signals on path 226 which correspond to the reflected signal energy 222 from the desired target 220 as well as undesired clutter signals 280 and pulsed interference 229s. In this context, clutter signals include reflections from undesired targets within the region scanned by the radar system 210. Such unwanted targets may include trees 227, which can move in the wind and thereby can simulate motion, nearby objects which do not move, such as buildings, which can produce relatively large-amplitude signals, and birds in flight, which inherently have motion. Mutual interference can be due to pulsed signals that are transmitted by other radars that are in close proximity. Such interference can occur from antenna sidelobe transmissions from other radars as well as from antenna mainlobe transmissions, and can occur when radars are operating in other frequency bands as well as when operating in a common frequency band. When operating in other frequency bands, the source of mutual interference tends to be due to the wide, out-of-band, frequency modulation noise spectrum that is typical of many radar transmitters. The output signals from receiver 224 on path 226 are applied to both a Mutual Interference Detector 242 and a Mutual Interference Processor 228. The Mutual Interference Detector 242 generates the information that is necessary to control the Mutual Interference Processor 228.

Figures 3, 3A, 3F:
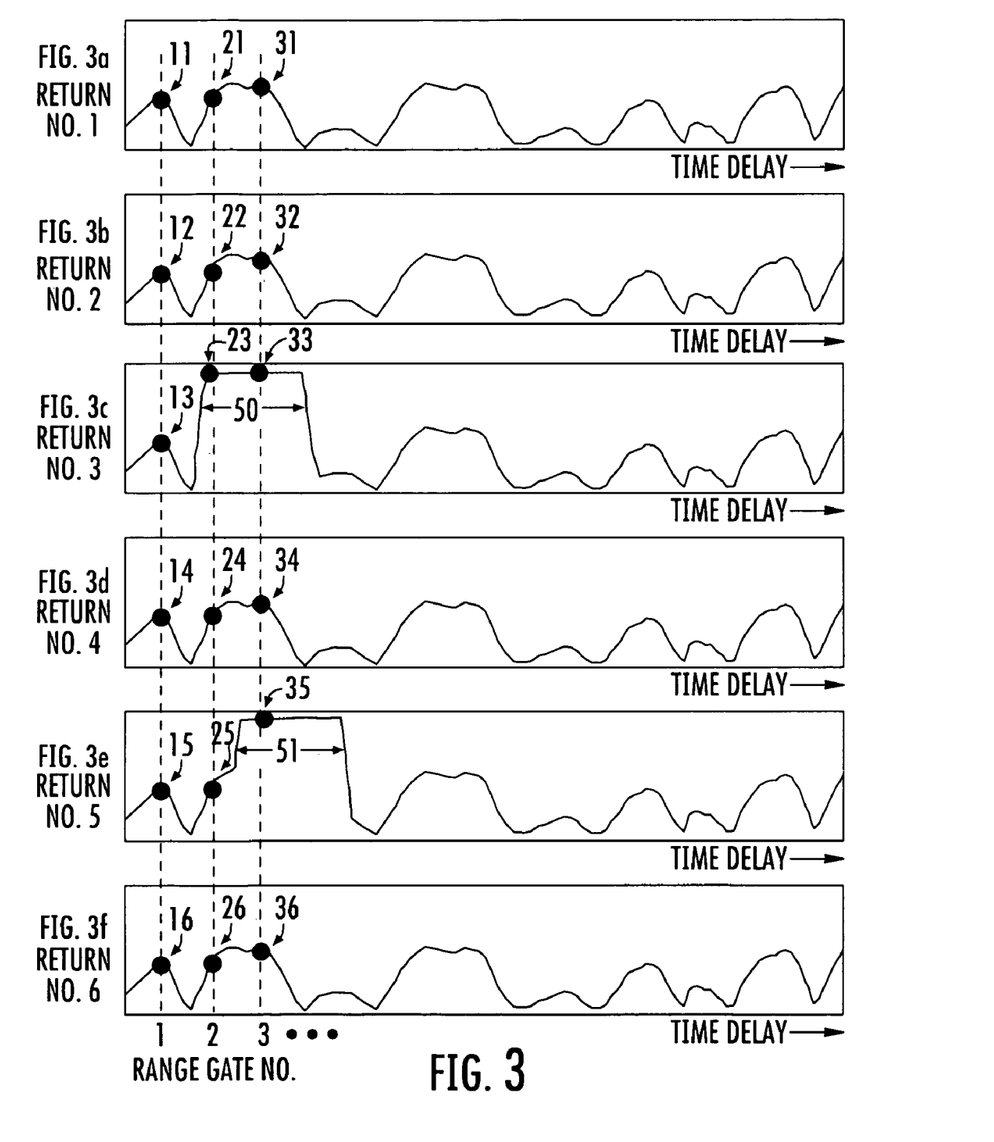

The first step in generating the information required to control the Mutual Interference Processor 228 of FIG. 2 is the detection of pulsed interference by the Mutual Interference Detector 242. This is a known process, and is easily implemented by comparing the amplitudes of the signal returns to a threshold value. Because the time intervals between pulse transmissions within a pulse-Doppler sequence are small, typically on the order of a millisecond or less, the target and clutter signals are usually highly correlated from signal return to signal return within the sequence, which results in little signal-return-to-signal-return amplitude change at any given time delay, as generally illustrated in FIGS. 1a through 1f. In contrast to FIGS. 1a through 1f, which illustrate pulse-Doppler signal returns for only target and clutter signals, FIGS. 3a and 3b, and 3d and 3f, illustrate typical pulse-Doppler signal returns for target signals 222 and clutter signals 280, while FIGS. 3c and 3e illustrate typical pulse-Doppler signal returns for target signals 222, clutter signals 280, and pulsed interference signals 229s, combined. The intermittent nature of pulsed interference causes significant changes in signal levels, when viewed across signal returns at any given time delay, as illustrated in FIGS. 3a through 3f, in contrast to the relatively constant signal levels that exist across signal returns at any given time delay when pulsed interference is absent, as illustrated in FIGS. 1a through 1f. In FIG. 3c, the pulsed interference occurring in relation to the third transmitted pulse is labeled as 50, and in FIG. 3e the pulsed interference occurring in relation to the fifth transmitted pulse is labeled as 51. The existence of pulsed interference can therefore be easily established in block 242 of FIG. 2 by simply thresholding the signal returns of FIGS. 3a through 3f with an amplitude that is related to the average signal level, in order to produce a signal that identifies the contaminated pulse-Doppler signal returns. This signal is designated L in FIG. 2, and it is applied from block 242 of FIG. 2 by way of a path 243 to block 244 of the Measurement and Correction Function Synthesis block 231 of Mutual Interference Processor 228. For the example of FIGS. 3a through 3f for Range Gate No. 1, L would specify or indicate no signal return numbers because no pulsed interference occurred on any signal return numbers on Range Gate No. 1. For Range Gate No. 2, L would specify pulsed interference occurred on signal return number 3 of FIG. 3c; and, for Range Gate No. 3, L would specify pulsed interference occurred on both signal return numbers 3 and 5 of FIGS. 3c and 3e. In a similar manner, signal L produced by block 242 would specify which signal returns, if any, were contaminated by pulsed interference for all remaining range gates.

Figure 4:
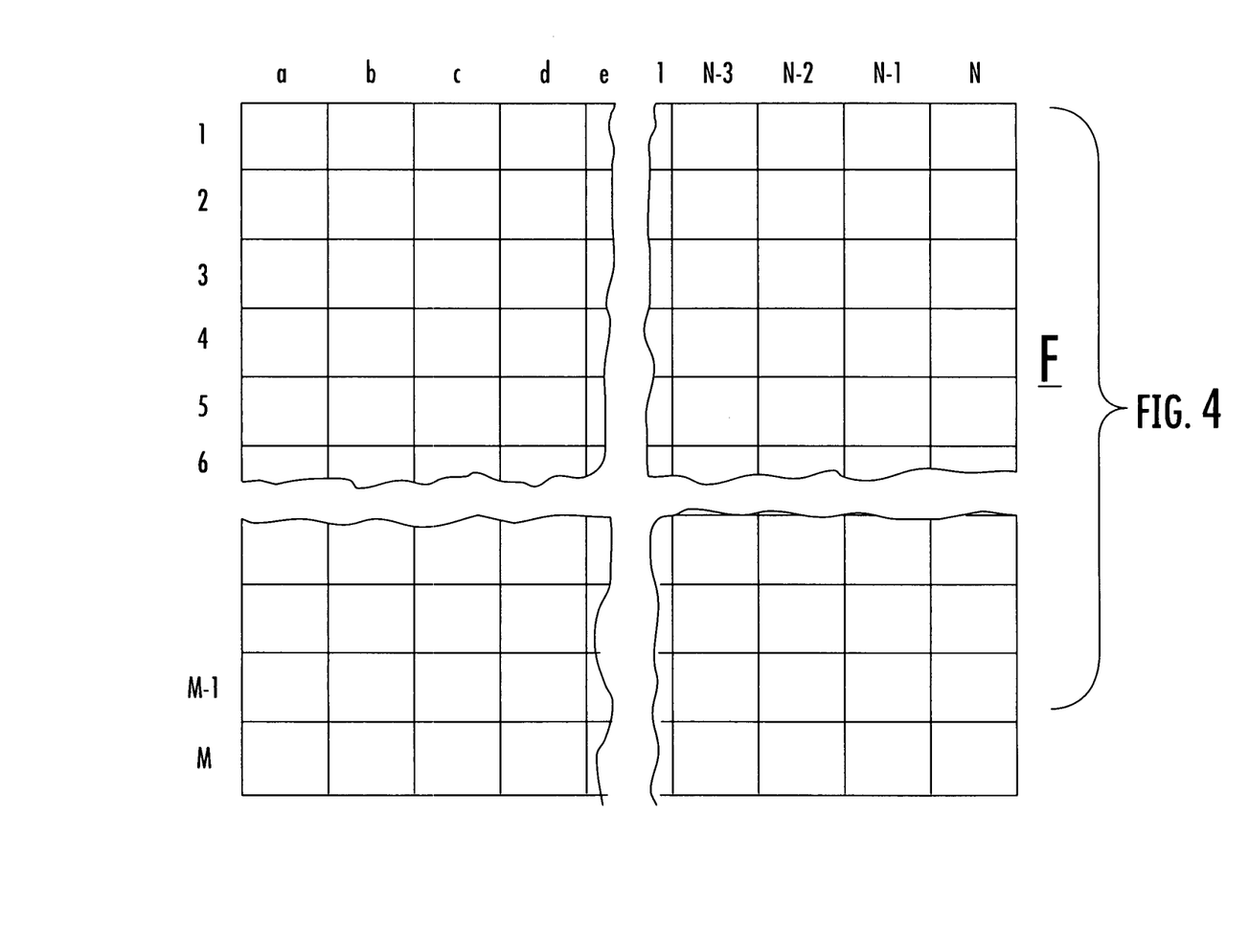
FIG. 4 illustrates a matrix.

Block 244 of FIG. 2 may be viewed as representing a matrix F that describes processing characteristics of pulse-Doppler filter bank 234. The columns of matrix F that are selected by signal L are Doppler Interference Distribution vectors that are sent to block 246 and by way of a path 245 to block 248. The Doppler Interference Distribution vectors describe how the pulsed interference, that occurred on the contaminated pulse-Doppler signal return numbers that are specified by the signal L, are distributed to the Doppler frequency domain by pulse-Doppler filter block 234. The Doppler Interference Distribution vectors are used to synthesize Measurement and Correction vectors for the removal of pulsed interference that are compatible with pulse-Doppler filter suppression of high-levels of clutter signals. For purposes of explanation, the characteristics of matrix F are described in terms of the results that would be obtained if it were used to process pulse-Doppler signal returns. FIG. 4 illustrates a representative matrix F, which has M rows and N columns. Each element or cell (an open box) of matrix F is filled with a complex number (not illustrated), which multiplies a sample of a corresponding pulse-Doppler signal return. For example, in order to process Range Gate No. 1 of FIGS. 1a through 1f, the complex number associated with cell a1 of row 1 of matrix F multiplies sample 11 of signal return number 1 of FIG. 1a, the complex number associated with cell b1 of row 1 of matrix F multiplies sample 12 of signal return number 2 of FIG. 1b, and the complex number associated with cell c1 of row 1 of matrix F multiplies sample 13 of signal return number 3 of FIG. 1c. In a corresponding manner, the complex numbers of the remaining cells of row 1 multiply the samples of the corresponding remaining signal returns of Range Gate No. 1. Summing the values that result from all of the first row multiplication operations produces an output signal that corresponds to the output of the first pulse-Doppler filter of block 234 of FIG. 2. In a similar manner, multiplying the values in the second row (row 2) of matrix F with the samples of Range Gate No. 1 of FIGS. 1a through 1f and summing the resulting multiplication products produces an output signal that corresponds to the output of the second pulse-Doppler filter in block 234. And, in a continuing manner, multiplying the values of the cells in each remaining row of matrix F by the samples of Range Gate No. 1 of FIGS. 1a through 1f and summing the resulting multiplication products produces output signals that correspond to the output signals of each of the remaining pulse-Doppler filters in block 234. Each successive range gate is then processed by matrix F in a manner similar to that described above for Range Gate No. 1. Thus it can be seen that each row of elements in matrix F of FIG. 4 corresponds to a specific pulse-Doppler filter in block 234 of FIG. 2, and each column of matrix F corresponds to a specific signal return number within the pulse-Doppler sequence.

Block 246 of FIG. 2 implements a process for deleting the elements that correspond to pulse-Doppler filters that contain clutter signals from the Doppler Interference Distribution vectors that are passed from block 244. The information as to which pulse-Doppler filters contain clutter signals is input or applied to block 246 in the form of a signal designated "d". The Doppler frequency distributions of clutter signals tend to change slowly with time, if at all. Thus, the information in signal d is likely to remain unchanged over long periods of time, and may be assumed to represent predetermined data stored in block 246. Alternatively, the information in d may be determined on-line, extrinsic to block 246, and made available thereto. Block 246 reduces or sets the complex numbers or values to zero in those row elements in each vector passed from block 244, which correspond to pulse-Doppler filters that contain clutter. By reducing or setting these element values to zero, block 246 removes or minimizes any corrupting influence clutter signals may have on the pulsed interference measurement vectors. The resulting vectors are then sent from block 246 by way of a path 247 to input port $248_i$ of the Orthogonalize block 248.

Because pulsed interference may contaminate more than one signal return in a pulse-Doppler signal sequence, methods for removing the pulsed interference on any one signal return within the sequence may potentially interact with, and degrade, removal of pulsed interference from other signal returns within the sequence. The Orthogonalize or Remove Overlap function block 248 in FIG. 2 removes overlapping portions of the vectors that are received from block 246 in order to prevent or at least minimize such interactions and degradations. Orthogonalization in block 248 is accomplished by removing overlapping portions of each vector in turn. Orthogonalization with respect to the first vector is accomplished by removing, from all of the remaining vectors, portions that overlap with the first vector. Orthogonalization with respect to the second vector is accomplished by removing, from all of the remaining vectors, excluding the first vector, portions that overlap with the second vector. Orthogonalization with respect the third vector is accomplished by removing, from all of the remaining vectors, excluding the first and second vectors, portions that overlap with the third vector. In a similar manner, the above-described overlap removal process is continued till overlapping portions are removed from all of the vectors. For any two vectors in the above process, the overlapping portion of the first vector is removed from the second vector by a two step procedure. The first step consists of calculating the overlap projection of the first vector onto the second vector. The overlap projection is the ratio of two numbers. The numerator of the ratio is calculated as the sum of the products obtained by multiplying the complex conjugated values of the elements of the first vector by the corresponding element values of the second vector. The denominator is calculated as the sum of the squared-magnitudes of the element values of the first vector. The second step consists of multiplying the projection value that was calculated in step number 1, with each of the element values of the first vector and subtracting the resulting multiplication products from the corresponding element values of the second vector. The Doppler Interference Distribution vectors that are passed to block 248 directly from block 244 are processed in a similar manner. That is, for each vector passed from block 246, a corresponding vector is passed directly from block 244. For each vector pair from block 246 that is processed for overlap removal in block 248 as explained above, the corresponding vector pair from block 244 is processed in an analogous manner, except for the overlap projection. In processing each vector pair received from block 244, the projection value that is used is that value that is calculated for the corresponding vector pair from block 246, as explained above. The resulting two orthogonalized vector sets are then passed from block 248 to blocks 250 and 251, respectively.

The Normalize block 250 of FIG. 2 scales each vector so that it provides the correct level for measurements of pulsed interference when used in Pulsed Interference Removal Processor 230. Normalization in block 250 consists of dividing each element value by the sum of the squared-magnitudes of all of the element values in the vector. The normalized vectors are then sent from output port 250o to block 252 of FIG. 2.

Blocks 244, 246, 248 and 250 of FIG. 2 perform processing steps to synthesize the pulsed interference measurement vectors in the Doppler frequency domain in order to remove or minimize any corrupting influence due to clutter signals. Blocks 251 and 252 of FIG. 2 complete the synthesis of the Measurement and Correction vectors by converting their respective input vectors for application to the time-series pulse-Doppler signal returns of path 226. Block 252 processes its input vectors by multiplying them by the complex-conjugate-transpose of matrix F (designated F'). Block 251 processes its input vectors by multiplying them by the mathematical pseudo-inverse of matrix F (designated $F^{-I}$). Matrix F is the same matrix that is described in conjunction with FIG. 4 and block 244 of FIG. 2.

The pulse-Doppler signal returns, including clutter and pulsed interference, enter the Pulsed Interference Removal Processor block 230 of FIG. 2 from the receiver (RX) block 224 via path 226 in the form of a time-series vector (x) for each range gate. For each vector (x), a Measurement vector (μ) and a corresponding Correction vector (v) are received at block 230 via paths 238 and 240, respectively, for each pulse-Doppler signal return number that is contaminated with pulsed interference that is to be removed. The Measurement vectors (μ) are applied to the vector (x) by the vector dot-product (•) block 260 in order to produce measurements of pulsed interference on path 270 which may be viewed as being free of clutter interference. The vector dot-products are calculated as the sums of the products obtained by multiplying the complex-conjugated element values of the measurement vectors (μ) with the corresponding element values of the vector (x). The measurements on path 270 are complex numbers that describe the amplitudes and phase angles of the pulsed interference. The measurements on path 270 are then used, in multiplier block 264, to multiply each element value in the corresponding Correction vectors (v). The resulting amplitude scaled and phase angle adjusted Correction vector element values are generated on path 265, and are then subtracted from the corresponding element values of vector (x) in subtraction block 262. When all of the Measurement and corresponding Correction vectors have been applied, then removal or suppression of the pulsed interference in that range gate is completed. Each successive range gate vector (x) that is contaminated with pulsed interference is processed by block 230 in a similar manner.

After pulsed interference is removed from the range gate vectors (x) by block 230 in FIG. 2, the vectors (x) are sent via path 232 to the pulse-Doppler filter block 234. Pulse-Doppler filter block 234 is prior art and tends to separate and remove clutter signal returns from target signal returns based on differences in Doppler frequencies. Pulse-Doppler filter implementations are often based on fast Fourier Transform algorithms because these algorithms require fewer multiply and add processing operations than other implementation approaches. One variation of implementation is to implement the pulse-Doppler filter bank by a matrix multiply operation. With this approach, each row of elements in the matrix corresponds to a specific filter, and is implemented as discussed in the explanation of matrix F of block 244. The result of block 234 is that clutter signal returns tend to be separated into those pulse-Doppler filters that correspond to the Doppler frequencies of the clutter and tend to be minimized or suppressed in those pulse-Doppler filters that correspond to Doppler frequencies of targets that are to be detected.

After clutter signal returns are minimized and suppressed by pulse-Doppler filter block 234 of FIG. 2, the pulse-Doppler signal returns are sent via path 236 to the Signal Integrator block 274. Signal integration processing can include such prior art processing operations as pulse compression and other processing operations, such as coherent signal integration and noncoherent signal integration, to further enhance the target detection sensitivity of the radar. The signal returns are then sent via path 276 to the Target Detector block 278. The detection of target signal returns is accomplished in the Target Detector block 278 by comparing the magnitudes of the signal returns to a threshold whose value is set to minimize false alarms. A wide variation in detector implementations exist, such as basing the comparison on the square, or on the logarithm, of the signal magnitude, and deriving the threshold value from signal return noise level measurements, often called constant false alarm rate detection, or CFAR detection. This completes the processing steps to maintain radar target detection sensitivity during combined clutter and pulsed interference conditions.

Figure 5:
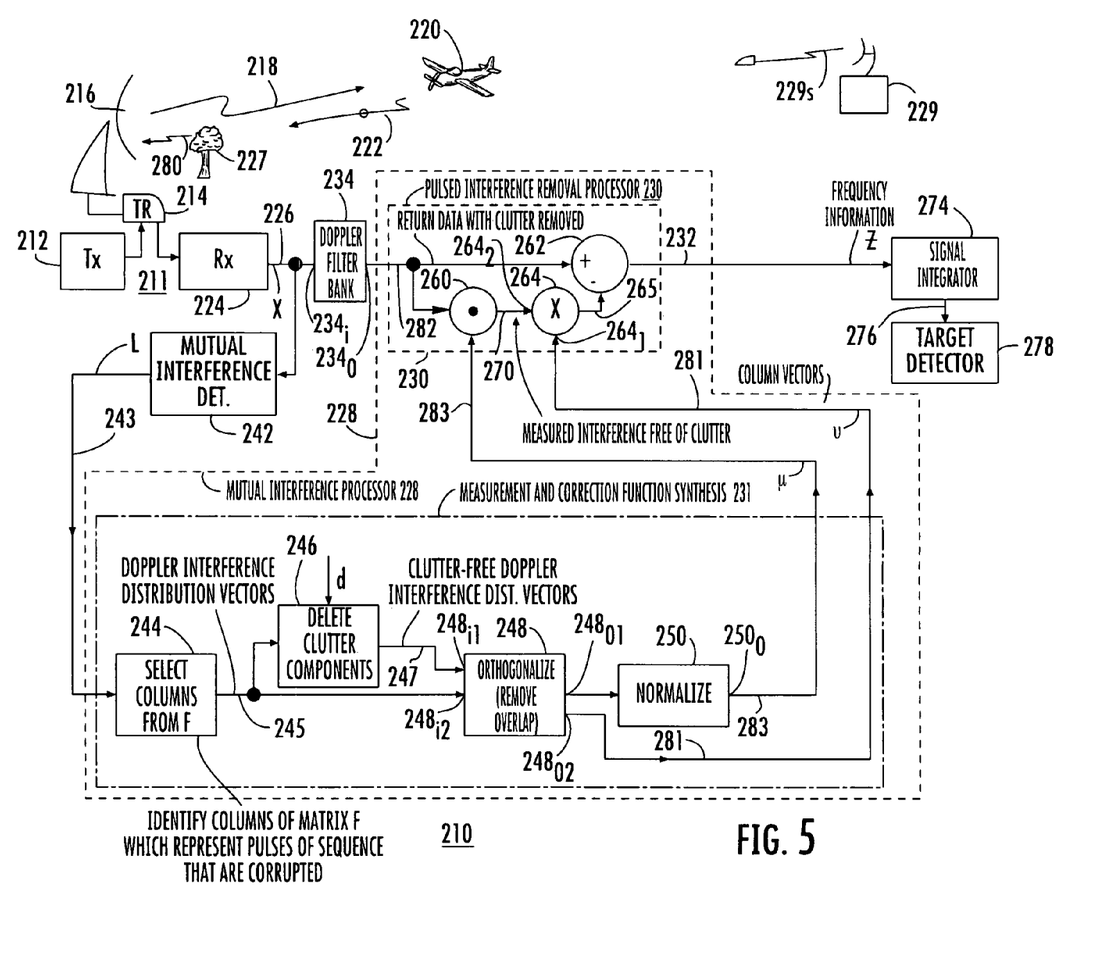
FIG. 5 is a simplified block diagram of a radar system similar to that of FIG. 2, but with a different location of the pulse-Doppler filter bank.

FIG. 5 is similar to FIG. 2, but differs in that the pulse-Doppler filter bank 234 is located prior (in the direction of signal flow) to the Mutual Interference Processor 228. Interchanging the order in which the Mutual Interference Processor 228 and the pulse-Doppler filter bank 234 are applied to the signals on path 226 is possible because both processors perform algebraically linear operations on the signals. The configuration of FIG. 5 shows the pulsed interference measurement signals and correction signals, on paths 281 and 283, being made available to pulsed interference removal processing block 230 for application to the output signals produced on path 282 from the output port 234o of pulse-Doppler filter bank 234. Since the output signals from the pulse-Doppler filter bank are frequency-domain signals, the applied pulsed interference measurement signals and correction signals must also be frequency-domain signals. Frequency-domain versions of the pulsed interference measurement and correction signals are provided by omitting processing blocks 251 and 252, shown in FIG. 2, from the Mutual Interference Processor 228 as shown in FIG. 5. The omission of processing blocks 251 and 252 leaves the pulsed interference measurement signals and correction signals as frequency-domain signals, rather than converting them to the time domain. The configuration shown in FIG. 5 may be preferable to the configuration shown in FIG. 2 for some applications of the Mutual Interference Processor because fewer processing operations may be required.

A method according to an aspect of the invention as shown in FIG. 2, is for sensing remote targets (220) in the presence of interfering signals (229s). The method comprises the step of radiating energy (218) toward the target (220), and receiving reflected energy (222) containing amplitude and phase information relating to the target, for generating received energy signals (on path 226). The received energy signals may be contaminated by clutter signals (280) at Doppler frequencies of clutter (227), and by pulsed interference (229s). The method includes the step of generating (242) time-distribution signals (L) which characterize the distributions of the pulsed interference (229s) within the received energy signals (on path 226). Measurement signals (μ) are synthesized (231) from the time-distribution signals (L). The measurement signals (u) represent the normalized-amplitude pulsed interference in a Doppler frequency region which is free of clutter signals (280). Correction signals (v) are also synthesized (231) from the time-distribution signals (L). The correction signals (v) represent the normalized-amplitude pulsed interference over the entire Doppler frequency region, including the Doppler frequency region of the clutter signals (280). The received energy signals (on path 226) are processed (260) with the measurement signals (μ) to generate nominally clutter-free phase and amplitude estimates of the pulsed interference (on path 270). The nominally clutter-free phase and amplitude estimates of the pulsed interference are used to adjust (264) the phases and amplitudes of the correction signals (v) to generate estimated pulsed interference (on path 265). The estimated pulsed interference (on path 265) is subtracted (262) from the received energy signals (on path 226) to produce received energy signals (on path 232) which nominally include clutter signals and that are nominally free of pulsed interference. In a mode of the method, the step of processing the received energy signals (on path 226) with the measurement signals (μ) includes the calculation of an inner product (260), which may be a vector dot product. In another mode of the method, the nominally clutter-free phase and amplitude estimates of the pulsed interference (on path 270) are in the form of complex numbers, and the step of using the nominally clutter-free phase and amplitude estimates to adjust (264) the phases and amplitudes of the correction signals (v) comprises the step of calculating a product, which may be an arithmetic complex multiplicative product. In another mode of the method, the step of generating correction signals (v) which represent the amplitude-normalized pulsed interference includes the steps of converting (244) the signals (L) which characterize the time-distributions of the pulsed interference into Doppler interference distribution signals (on path 245) which characterize the Doppler frequency distributions of the pulsed interference (229s), and orthogonalizing (248) the Doppler interference distribution signals (on path 245) to uniquely represent the frequency components of the pulsed interference (on path 281). The orthogonalized correction signals are converted (251) from the frequency domain to the time domain for application to the received energy signals (on path 226). In another mode of the method, the step of generating measurement signals (μ) includes the steps of converting (244) the signals (L) which characterize the time-distributions of the pulsed interference into signals which characterize the Doppler frequency distributions of the pulsed interference (on path 245), and deleting (246) or suppressing those frequency components of the Doppler frequency distribution signals which lie in the region of clutter frequencies, to thereby generate clutter-free pulsed interference measurement signals (on path 247). The clutter-free pulsed interference measurement signals are orthogonalized (248) to generate signals (at output port 248o1) which uniquely represent the frequency components of the pulsed interference that are free of clutter signals. The orthogonalized clutter-free pulsed interference measurement signals are amplitude-normalized (250). The normalized and orthogonalized clutter-free pulsed interference measurement signals (on path 283) are converted (252) from the frequency domain to the time domain for application to the received energy signals (on path 226). One mode of the method further comprises the step of applying the received energy signals, that nominally include clutter signals and that are nominally free of pulsed interference (on path 232), to a pulse-Doppler filter (234) for removal of the clutter signals.

A method according to another aspect of the invention as shown in FIG. 2, for sensing remote target(s) (220) in the presence of interfering signals (229s) and clutter signals (280), comprises the steps of radiating sets of sequential pulses of energy (218) toward the target (220), and receiving reflected energy (222) containing amplitude and phase information relating to the target (220) to thereby generate received energy signals (on path 226), which may be at base band or at an intermediate frequency, and which may be analog or digital. The identity(ies) of those pulses of the sequence which are contaminated with pulsed interference (229s) are extracted (242) from the received energy signals (on path 226) and listed (L). A pulse-Doppler filter bank (234) including a plurality of filters is provided, where each of the plural filters is associated with a different frequency range, some of which frequency ranges are associated with clutter signals (280). A matrix (F) corresponding to the pulse-Doppler filter bank (234) is identified, in which each column of the matrix corresponds to a pulse of the sequence, and in which each row of the matrix corresponds to a frequency range different from that of other filters of the pulse-Doppler filter bank. Those column(s) of the matrix corresponding to the contaminated pulses of the sequence are identified (244). Those rows of the identified column(s) of the matrix (on path 245) which correspond to the Doppler frequencies of the clutter signals (280) are set to zero (246) and orthogonalized (248) to remove or reduce projection overlap or interdependencies, and are then normalized (250) to produce frequency-domain pulsed interference measurement signals (on path 283). The identified columns(s) of the matrix (on path 245) are also directly orthogonalized (248) to remove projection overlap or interdependencies and produce frequency-domain pulsed interference correction signals (on path 281). In a mode of the method as shown in FIG. 2, the frequency-domain measurement and correction signals (on paths 283 and 281) are converted to the time domain (in blocks 252 and 251). The time-domain measurement signals (μ) are then applied (260) to the received energy signals (on path 226) in the time domain in order to obtain amplitude and phase estimates of the pulsed interference (on path 270). The amplitude and phase estimates (on path 270) are used to adjust (264) the time-domain correction signals (v). The adjusted time-domain correction signals (on path 265) are then combined (262) or processed with the time-domain received energy signals (on path 226) to remove or reduce the pulsed interference. The resulting received energy signals with nominally reduced or removed pulsed interference (on path 232) are then applied to the pulse-Doppler filter bank (234) to remove or reduce the clutter signals. In another mode of the method as shown in FIG. 5, the received energy signals (on path 226) are first processed by a pulse-Doppler filter bank (234) to remove or suppress the clutter signals (280) and produce frequency-domain received energy signals (on path 282). The frequency domain measurement signals (on path 283) are then applied (260) to the frequency-domain received energy signals (on path 282) in order to obtain amplitude and phase estimates of the pulsed interference (on path 270). The amplitude and phase estimates (on path 270) are used to adjust (264) the frequency-domain correction signals (on path 281). The adjusted frequency-domain correction signals (on path 265) are then combined (262) or processed with the frequency-domain received energy signals (on path 282) to tend to reduce the effect of the pulsed interference and to aid in extraction of information relating to the target from the phase and amplitude information. The step of combining (262) may consist of a difference or subtraction.

According to another aspect of the invention as shown in FIG. 2, a method for obtaining information about a remote target (220) in the presence of clutter (227) and mutual interference (229s) comprises the step of transmitting toward the target pulses of electromagnetic energy (218), and receiving reflected energy signals (222) including phase and amplitude information, and possibly clutter signals (280) and pulsed interference (229s). The received energy signals (on path 226) are processed (242) to produce signals (L) indicative of which pulse portions of the received energy signals (on path 226) are contaminated with pulsed interference (229s). A pulse-Doppler filter bank (234) including at least an input port and output ports is provided. The pulse-Doppler filter bank (234) defines at least one frequency bin which is representative of clutter signals (280). A matrix is defined, the rows and columns of which relate to the characteristics of the pulse-Doppler filter bank (234). From the pulsed interference indicative signals (L), those columns of the matrix to which the pulsed interference (229s) relates are selected (244), to thereby produce interference related column vectors (on path 245). Those rows of the interference related column vectors (on path 245) which are associated with clutter signals (280) in the pulse-Doppler filter bank (234) are tagged for being rendered ineffective (246), to thereby produce column vectors with row values set to zero (on path 247). The vectors with row values set to zero (on path 247) and the pulsed interference related column vectors (on path 245) are orthogonalized (248), to thereby produce orthogonalized column vectors with row values set to zero and orthogonalized interference related vectors. The orthogonalized vectors with row values set to zero are normalized (250). The normalized and orthogonalized vectors with row values set to zero (on path 283) are multiplied (252) by the complex-conjugate-transpose of the matrix to produce pulsed interference measurement vectors ($\mu$). The orthogonalized pulsed interference related vectors (on path 281) are multiplied (251) by the mathematical pseudo-inverse ($F^{-1}$) of the matrix to produce pulsed interference correction vectors (v). The vector dot products (260) of the received energy signals (on path 226) and the measurement vector(s) ($\mu$) is or are calculated (260) to thereby generate phase and amplitude measurements of the pulsed interference (on path 270) that are nominally free of clutter signals. The correction vectors (v) are adjusted (264) or processed in conjunction with the clutter-free phase and amplitude measurements of the pulsed interference (on path 270), to thereby produce pulsed interference equivalent correction signal vectors (on path 265). The adjustment or processing (264) may be in the form of multiplication (X). The pulsed interference equivalent correction signal vectors (on path 265) are subtracted (262) from the received energy signals (on path 226) to produce (on path 232) received energy signals that are nominally free of pulsed interference. In one mode of the method, the adjusted received energy signals that are nominally free of pulsed interference (on path 232) are applied to an input port of the pulse-Doppler filter bank (234) to suppress the clutter signals (280).

What is claimed is:

1. A method for sensing remote targets in the presence of interfering signals, said method comprising the steps of:
radiating energy toward said target, and sensing reflected energy containing amplitude and phase information relating to said target, for generating received energy signals which may be contaminated by pulsed interference and by clutter signals at Doppler frequencies including clutter frequencies;

generating time-distribution signals characterizing the time-distributions of said pulsed interference within said received energy signals;

from said time-distribution signals, generating measurement signals representing normalized amplitudes of said pulsed interference in a Doppler frequency region free of clutter signals;

from said time-distribution signals, generating correction signals representing normalized pulsed interference over the entire Doppler frequency region;

processing said received energy signals with said measurement signals to generate clutter-free interference signals representing phases and amplitudes of said pulsed interference;

using said clutter-free interference signals to adjust the amplitudes and phases of said correction signals to generate estimated pulsed interference;

subtracting said estimated pulsed interference from said received energy signals to produce received energy signals nominally free of pulsed interference and nominally including clutter signals; and applying said received energy signals nominally free of pulsed interference and nominally including clutter signals to a pulse-Doppler filter to produce received energy signals nominally free of pulsed interference and nominally free of clutter signals.

2. A method according to claim 1, wherein said step of processing said received energy signals with said measurement signals includes calculating inner products.

3. A method according to claim 2, wherein said inner products are vector dot products.

4. A method according to claim 1, wherein said clutter-free signals representing phases and amplitudes are in the form of complex numbers, and
said step of using said clutter-free signals to adjust the amplitudes and phases of said correction signals comprises the steps of calculating products.

5. A method according to claim 4, wherein said steps of calculating products includes calculating multiplicative products.

6. A method according to claim 1, wherein said step of generating correction signals representing normalized pulsed interference includes the steps of;
converting said time-distribution signals into Doppler interference distribution signals representing the Doppler frequency distribution of said pulsed interference;
orthogonalizing said Doppler interference distribution signals to generate signals uniquely representing the pulsed interference frequency components, without plural representation of any one interference component; and
converting said orthogonalized signals from the frequency domain to the time domain to thereby generate said correction signals.

7. A method according to claim 6, whereby the orthogonalization that is performed in the synthesis of correction signals or vectors is performed over the Doppler region that is free of clutter signals and is spanned by the pulsed interference measurement signals or vectors.

8. A method according to claim 1, wherein said step of generating measurement signals includes the steps of;
converting said time-distribution signals into Doppler interference distribution signals representing the Doppler frequency distribution of said pulsed interference;
deleting those frequency components of said Doppler interference distribution signals which lie at clutter frequencies, to thereby generate clutter-free Doppler interference distribution signals;

orthogonalizing said clutter-free Doppler interference distribution signals to generate clutter-free Doppler interference distribution signals which uniquely represent the pulsed interference frequency components, without plural representation of any one interference component;

normalizing the amplitudes of said orthogonalized clutter-free Doppler interference distribution signals to generate normalized orthogonalized clutter-free Doppler interference distribution signals; and converting said normalized orthogonalized clutter-free Doppler interference distribution signals from the frequency domain to the time domain to thereby generate said measurement signals.

9. A method according to claim 8, whereby the orthogonalization that is performed in the synthesis of measurement signals or vectors is performed over the Doppler region that is free of clutter signals and is spanned by the pulsed interference measurement signals or vectors.

10. A method for sensing remote targets in the presence of interfering signals, said method comprising the steps of:

radiating energy toward said target, and sensing reflected energy containing amplitude and phase information relating to said target, for generating received energy signals which may be contaminated by pulsed interference and by clutter signals at Doppler frequencies including clutter frequencies;

generating signals characterizing the time-distributions of said pulsed interference within said received energy signals;

from said time-distribution signals, generating measurement signals representing normalized amplitudes of said pulsed interference in a Doppler frequency region free of clutter signals;

from said time-distribution signals, generating correction signals representing normalized pulsed interference over the entire Doppler frequency region;

processing said received energy signals with a pulse-Doppler filter bank to produce received energy signals that include pulsed interference and that are nominally free of clutter signals;

processing said received energy signals that include pulsed interference and that are nominally free of clutter signals, with said measurement signals to generate clutter-free signals representing phases and amplitudes of said pulsed interference;

using said clutter-free signals representing phases and amplitudes to adjust the amplitudes and phases of said correction signals to generate estimated pulsed interference; and subtracting said estimated pulsed interference from said received energy signals that are nominally free of clutter signals to produce received energy signals that are nominally free of clutter signals and are nominally free of pulsed interference.

11. A method according to claim 10, wherein said step of processing said received energy signals with said measurement signals includes calculating inner products.

12. A method according to claim 11, wherein said inner products are vector dot products.

13. A method according to claim 10, wherein said clutter-free signals representing phases and amplitudes are in the form of complex numbers, and said step of using said clutter-free signals to adjust the amplitudes and phases of said correction signals comprises the steps of calculating products.

14. A method according to claim 13, wherein said steps of calculating products includes calculating multiplicative products.

15. A method according to claim 10, wherein said step of generating correction signals representing normalized pulsed interference includes the steps of;

converting said time-distribution signals into Doppler interference distribution signals representing the Doppler frequency distribution of said pulsed interference; and orthogonalizing said Doppler interference distribution signals to generate said correction signals uniquely representing the pulsed interference frequency components, without plural representation of any one interference component.

16. A method according to claim 15, whereby the orthogonalization that is performed in the synthesis of correction signals or vectors is performed over the Doppler region that is free of clutter signals and is spanned by the pulsed interference measurement signals or vectors.

17. A method according to claim 10, wherein said step of generating measurement signals includes the steps of;

converting said time-distribution signals into Doppler interference distribution signals representing the Doppler frequency distribution of said pulsed interference;

deleting those frequency components of said Doppler interference distribution signals which lie at clutter frequencies, to thereby generate clutter-free Doppler interference distribution signals;

orthogonalizing said clutter-free Doppler interference distribution signals to generate clutter-free Doppler interference distribution signals which uniquely represent the pulsed interference frequency components, without plural representation of any one interference component; and normalizing the amplitudes of said orthogonalized clutter-free Doppler interference distribution signals to generate said measurement signals.

18. A method according to claim 17, whereby the orthogonalization that is performed in the synthesis of measurement signals or vectors is performed over the Doppler region that is free of clutter signals and is spanned by the pulsed interference measurement signals or vectors.

19. A method for obtaining information about a remote target in the presence of clutter and mutual interference, said method comprising the steps of:

transmitting toward said target pulses of electromagnetic energy, and receiving reflected energy signals including phase and amplitude information, and possibly clutter signals and pulsed interference;

processing said received energy signals to produce signals indicative of which pulse portions of said received energy signals are contaminated with pulsed interference;

providing a pulse-Doppler filter including at least an input port and output ports, said pulse-Doppler filter defining at least one frequency bin which is representative of clutter signals;

defining a matrix F whose rows and columns relate to the characteristics of said pulse-Doppler filter;

from said interference indicative signals, selecting those columns from said matrix F to which said interference relates, to thereby produce interference related column vectors;

tagging for being rendered ineffective those rows of said interference related column vectors which are associated with clutter in said pulse-Doppler filter, to thereby produce column vectors with row values set to zero;

orthogonalizing said vectors with row values set to zero and said interference related column vectors, to thereby produce orthogonalized column vectors with row values set to zero and orthogonalized interference related vectors;

normalizing said orthogonalized vectors with row values set to zero;

multiplying said normalized orthogonalized vectors with row values set to zero by the complex-conjugate-transpose of said matrix F to produce pulsed interference measurement vectors;

multiplying said orthogonalized interference related vectors by the mathematical pseudo-inverse of said matrix to produce pulsed interference correction vectors;

calculating the vector dot products of said received energy signals and said measurement vectors to thereby generate phase and amplitude measurements of said pulsed interference that are free of clutter;

adjusting or multiplying said correction vectors by said phase and amplitude measurements, to thereby produce interference equivalent correction signal vectors;

subtracting said interference equivalent correction signal vectors from said received energy signals to produce pulsed interference-adjusted received energy signals; and applying said pulsed interference-adjusted received energy signals to said pulse-Doppler filter to suppress the clutter signals.

20. A method according to claim 19, whereby the orthogonalization that is performed in the synthesis of measurement and correction signals or vectors is performed over the Doppler region that is free of clutter signals and is spanned by the pulsed interference measurement signals or vectors.

* * * * *